US006624739B1

(12) United States Patent
Stobbe

(10) Patent No.: US 6,624,739 B1

(45) Date of Patent: Sep. 23, 2003

(54) ACCESS CONTROL SYSTEM

(76) Inventor: Anatoli Stobbe, Steinradweg 3, D-30890 Barsinghausen (DE)

( * ) Notice: Subject to any disclaimer, the term of this patent is extended or adjusted under 35 U.S.C. 154(b) by 0 days.

(21) Appl. No.: 09/393,985

(22) Filed: Sep. 10, 1999

(30) Foreign Application Priority Data

Sep. 28, 1998 (DE) ........................................ 198 44 360

(51) Int. Cl.[7] .......................... G05B 19/00; H04Q 9/00

(52) U.S. Cl. ........................ 340/5.2; 340/5.1; 340/5.52; 340/5.7; 340/5.82; 235/382

(58) Field of Search ................................ 340/5.2, 5.52, 340/5.6, 5.61, 5.7, 5.53, 5.8, 5.81, 5.82, 5.83, 5.1, 5.33; 235/382, 375, 382.5, 380

(56) References Cited

U.S. PATENT DOCUMENTS

| | | | | | |
|---|---|---|---|---|---|
| 4,961,229 | A | | 10/1990 | Takahashi | 704/246 |
| 5,337,043 | A | | 8/1994 | Gokcebay | 340/5.67 |
| 5,719,950 | A | * | 2/1998 | Osten et al. | 340/825.54 |
| 5,887,140 | A | * | 3/1999 | Itsumi et al. | 340/825.34 |
| 5,903,225 | A | * | 5/1999 | Schmitt et al. | 340/825.31 |
| 5,995,014 | A | * | 11/1999 | DiMaria | 340/825.31 |
| 6,310,966 | B1 | * | 10/2001 | Dulude et al. | 382/115 |

FOREIGN PATENT DOCUMENTS

| | | |
|---|---|---|
| CA | 2142227 | 8/1996 |
| DE | 44 24 735 | 2/1996 |
| DE | 197 06 898 | 8/1997 |
| DE | 197 29 404 | 2/1999 |
| EP | 0 393 784 | 10/1990 |
| EP | 0 833 281 | 4/1998 |
| EP | 0 864 996 | 9/1998 |

* cited by examiner

*Primary Examiner*—Donnie L. Crosland
(74) *Attorney, Agent, or Firm*—Collard and Roe, P.C.

(57) ABSTRACT

An access control system is described. The access control system comprises at least one mobile transponder to be carried by a person, which has an authorization code, and at least one local control station having a reader, by means of which the authorization code of the transponder can be read as it is moved close to the reader in a non-contact manner and can be transmitted over a network to a primary and/or central code-evaluation device. In addition, biometric recording of inalienable characteristics of the person carrying the transponder and comparison of the recorded biometric characteristics to stored biometric data can be undertaken locally. Depending on the outcome of the comparison, a data word containing the authorization code of the transponder or the data word itself can be transmitted over the network to the code-evaluation device.

7 Claims, 2 Drawing Sheets

ACCESS CONTROL SYSTEM

BACKGROUND OF THE INVENTION

1. Field of the Invention

The present invention relates to an access control system having at least one mobile transponder having an authorization code, which is to be carried by a person, and at least one local control station having a reader by which the authorization code of the transponder can be read as it is moved close to the reader in a non-contact manner and can be transmitted over a network to a primary and/or control code evaluation device.

2. The Prior Art

A known problem of access control with a data carrier containing an access code is that it authorizes the owner of the data carrier rather than the authorized person himself or herself as determined on the basis of that person's individual characteristics. Should the data carrier fall into the hands of unauthorized persons, they can gain access. Access control systems to date were not in a position to identify the person him/herself and to make verification. This problem is solved only through the use of biometric systems.

In biometric systems inalienable characteristics of a person, such as voice, fingerprint, face or retina, are used as authorization. Here it is a matter of evaluating such characteristics which allow a person to be identified most clearly. Should this condition not be fulfilled, the biometric system does not substantially raise the security in access control, since the same biometric characteristic is shared by many people, meaning that other people can gain access on the basis of the biometric characteristic. On the other hand, the biometric characteristics may not be tolerated so closely that in the event of natural changes made to the characteristics or deviations during detection authorized persons are denied access.

A system is known as LEGICfinger, wherein a fingerprint of the person desiring access is interpreted as biometric data and is compared to stored data on this particular fingerprint. The stored data are in this case on a mobile data carrier in the form of a card which the person carries. To be able to store the multiple characteristics of a fingerprint on the data carrier, the system utilizes a data compression process which files the acquired fingerprint in compressed form in the memory of the data carrier. The known system manages this with 30 bytes of storage capacity.

If it were intended to acquire and store biometric characteristics such as faces in this same way, a storage capacity of approximately 2 to 5 bytes is required, which is approximately one hundred times the storage capacity compared to storage of fingerprints.

By comparison, all standard transponders operate with a storage capacity of 64 to 128 bits, equal to 8 to 9 bytes, and associated central code-evaluation instruments are designed for this capacity, by means of which a plurality of local control stations, which read the correcting code of the transponders, is connected over a network. If the biometric data were to be transmitted now in place of the usual data, the overall system would have to be modified, in particular the capacity of the data bank of the authorization code to be administered would have to be increased substantially. Furthermore, the transmission capacity and the transmission speed of the network would need to be increased. The known system does not permit the cost-effective expansion of an existing access control system for biometric tests. Rather, the entire system would have to be replaced, since enable times of maximum one second cannot otherwise be achieved.

Moreover, because of the relatively high storage requirement at the time, storage of the biometric data, in particular from recording biometric characteristics of faces, would not be possible in the memory of the transponder. But even in the case of adequate storage, non-contact transmission of this quantity of data in the long-wave range would give rise to considerable problems. The required transmission time for the data would be so great that with normal movement and handling of the transponders, a sufficiently stable transmission path within the collection area of the reader cannot be assumed.

The object of the present invention is to improve on an access control system of the kind mentioned previously to the effect that additional monitoring of people-specific characteristics is enabled while maintaining storage, transmission and evaluation of the authorization code assigned to the transponder.

SUMMARY OF THE INVENTION

This task is solved by an access control system connected over a network to a code-evaluation device to provide access based on a comparison of a person's biometric characteristics with biometric data stored in a memory. The system comprises:

(a) at least one mobile transponder to be carried by the person, which has an authorization code; and (b) at least one local control station comprising:

(i) a reader by which the authorization code of the transponder can be read as the transponder is moved close to the reader in a non-contact manner and can be transmitted over a network to a code-evaluation device;

(ii) a recording device operated by the transponder for recording inalienable biometric characteristics of the person carrying the transponder; and (iii) a comparator coupled to the transponder for comparing locally the recorded biometric characteristics to the stored biometric data;

wherein a data word is transmitted over the network to the code-evaluation device based on a match between the recorded biometric characteristics to the stored biometric data.

In the access control system according to the present invention, the standard authorization code of the transponder used to date can be stored therein, transmitted to the reader of the control station and transmitted over the network, either unchanged or slightly modified, to the primary or central code-evaluation instruments. Changes to these instruments are thereby necessary either not at all or only slightly. It is of major significance here also that the data set resulting for biometric comparisons and increased substantially compared to the authorization code does not have to be transmitted at each control procedure over the network and evaluated as primary or centrally.

The authorization code of the transponder can also be configured such that on the one hand it covers an adequate number of variation possibilities, but on the other hand can be transmitted in a sufficiently short time. In addition, those transponders are suited thereto which transmit their data to the reader in the long-wave range. In spite of the relatively low data rate, the transmission time for transmitting the complete authorization code is still sufficient whenever the transponder is brought into the field of the reader in the usual manual work movement and removed therefrom again immediately.

Through locally performed comparison of the recorded biometric characteristics to the stored biometric data, the particularly data-costly and time-consuming comparisons are carried into effect decentrally and thus parallel for all control stations. Particularly with systems having a large number of control stations and during control procedures arranged simultaneously, congestion in the data evaluation with the otherwise occurring consequence of increasing maintenance periods of more than one second in the individual control stations is avoided.

Furthermore, when the comparison is carried out locally it also allows an evaluation of biometric characteristics which is different from control station to control station, the independent modification of the control stations and the creation of different security steps individually matching requirements.

Common control of biometric characteristics and of the right authorization code of the transponder has the following drawbacks compared to a system which exclusively tests biometric characteristics. Without loss to overall security in testing for matching with biometric characteristics, a greater tolerance is permitted than is the case with exclusively biometric testing. The rejection rate of authorized persons on the basis of supposedly missing matching of the recorded biometric characteristics with the stored biometric data becomes minimal.

In accordance with a further development, the stored biometric data can be linked to the associated authorization codes of the transponders. For comparison of the recorded biometric characteristics to the stored biometric data, only the biometric data valid for the respective authorization code of the transponder is selected.

This drastically reduces the number of necessary comparisons of the recorded biometric characteristics to stored biometric data, since not the whole data volume has to be called on for the comparison. The calculation time is thus considerably less. Also, security against error recognition is increased, since there is a drop in the probability that comparisons with invalid data lead incorrectly to non-conformity.

Alternatively, it can be arranged that following local comparison of the recorded biometric characteristics to stored biometric data, only by their matching is the data word containing the authorization code of the transponder or the authorization code itself transmitted over the network to the code-evaluation device. The data word containing the authorization code of the transponder may also be transmitted constantly over the network to the code-evaluation device and the result of the comparison is contained in the data word.

In a first embodiment, an existing system, which to date has exclusively transmitted the authorization code of the transponder to the code-evaluation device, can remain unaltered. The second embodiment requires modification which may be restricted, however, to transmission and evaluation of the information of a comparison already made locally to the code-evaluation device. In the simplest case, this could be a yes/no status in the transmitted data word, which requires only one more bit. Opposing the additional loading of the network with transmission of the status no match of biometric characteristics with stored biometric data' is the possibility of being able to centrally store the data of missed access attempts.

There is also the possibility of performing the local comparison within the control station or within a mobile unit comprising the transponder.

An effective choice is made where an associated sensor can be arranged to record the biometric characteristics. The biometric data required for the comparison can also be stored there.

Preferably at least one sensor for recording biometric characteristics is arranged inside a mobile unit comprising the transponder. This can be a sensor for recording fingerprints or handprints, which is touched anyway during handling of the mobile unit.

This effectively decreases the risk of sensors at control stations being put out of order by vandalism. The recording of fingerprints or handprints solves the problem arising from the sensors being touched by different people.

If the sensor for biometric characteristics, the memory for biometric data and the comparator are arranged jointly in the mobile unit, the transponder can be controlled by the comparator such that the authorization code is transmitted to the reader only when the biometric characteristics recorded by the sensor are matched with the stored biometric data of the authorization code. Vice versa, nothing would be transmitted without a match.

In a system having different degrees of security, the system can comprise, depending on the degree of security of the controlled accesses, both control stations for low degrees of security, which exclusively comprise individual readers for transponders, and control stations for a high degree of security, which comprise both readers for transponders and biometric recording apparatus.

The access control system according to the present invention can be dynamically matched to the increased security requisites. With biometric components it is, of course, possible to apply various biometric recognition processes, such as fingerprint process, facial recognition process, voice recognition process or one of several combinations thereof. This makes feasible an additional hierarchy of security measures.

In practice it is effective to record the biometric characteristics to create comparative data under supervision. If storage of the biometric data is then provided in the control station, it is effective to store the biometric data centrally also and to transmit it to the control stations only once or intermittently over the network. In this way, uniform data are available to all connected control stations. This is effective also for these biometric data with expansions of or alterations to the databank and simplifies administration expenditure in terms of system maintenance.

BRIEF DESCRIPTION OF THE DRAWINGS

Other objects and features of the present invention will become apparent from the following detailed description considered in connection with the accompanying drawing which discloses two embodiments of the present invention. It should be understood, however, that the drawing is designed for the purpose of illustration only and not as a definition of the limits of the invention.

The invention will now be explained hereinafter with reference to the accompanying drawings, in which.

DETAILED DESCRIPTION OF PREFERRED EMBODIMENTS

Figure 1:
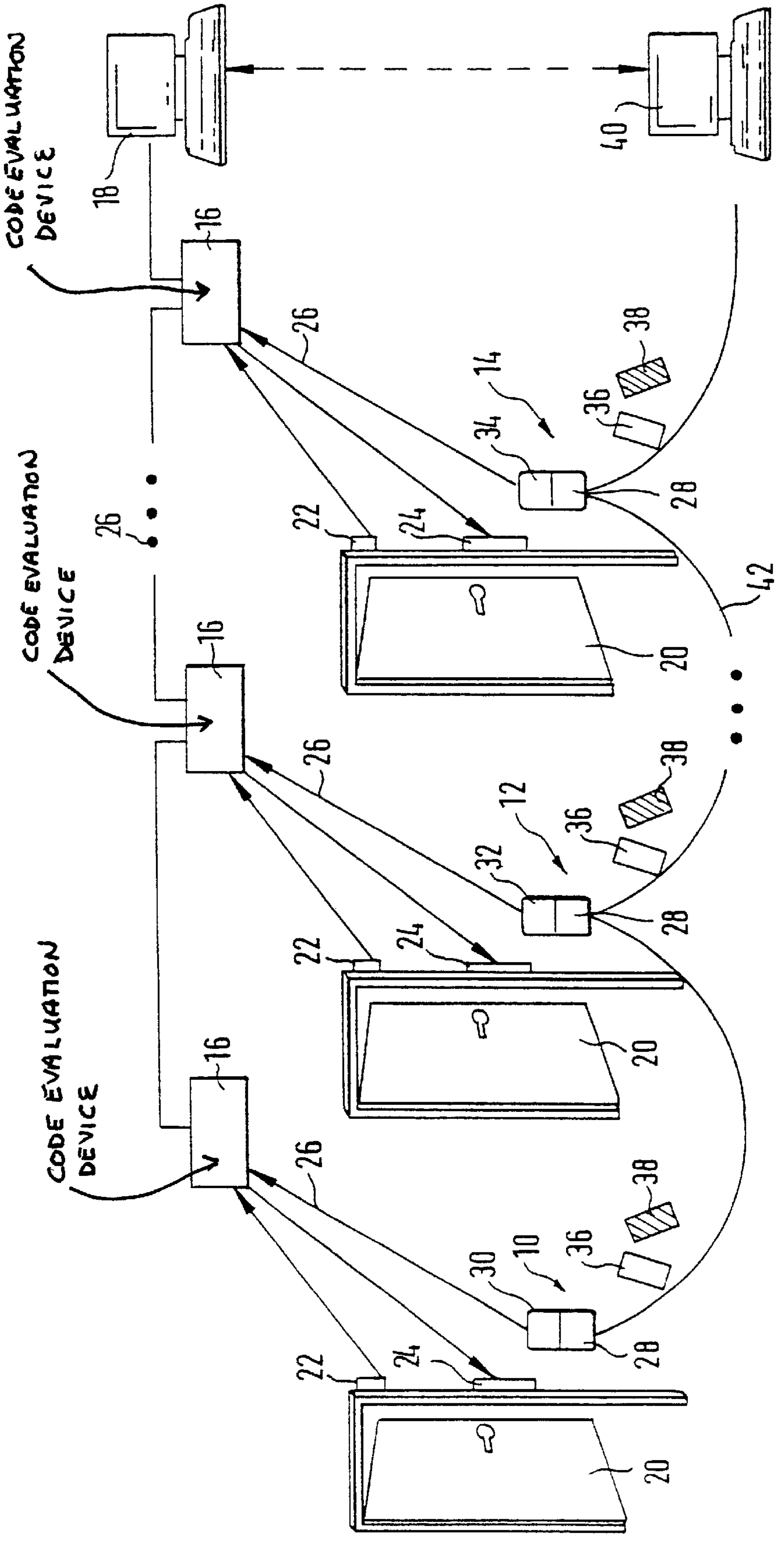
FIG. 1 is an embodiment of an access control system.

FIG. 1 illustrates an embodiment of an access control system having several monitored doors 20. Assigned to each door 20 is a status transmitter 22 for the open-closed state, a door-opener 24 and a control station 10, 12, 14. Each control station 10, 12, 14 comprises a reader 28 for a transponder 36 in which an authorization code is stored. This authorization code can be transmitted in a non-contact manner to reader 28. Each control station 10, 12, 14 also comprises a recording device for biometric characteristics. For example, control station 10 may comprise a recording device 30 having a sensor for fingerprints, control station 12 may comprise a recording device 32 having a sensor for facial characteristics and control station 14 may comprise a recording device 34 having a sensor for voice recognition.

Control stations 10, 12, 14 further comprise memories for biometric data and comparators for comparing the recorded biometric characteristics to the stored biometric data. Control stations 10, 12, 14 are connected over a network 26 to primary code-evaluation devices 16 and a central computer 18.

There are several possibilities for storing biometric data used for comparison in control stations 10, 12, 14. Thus it is possible to search sequentially all control stations, 10, 12, 14 for which an access authorization is to be allocated and to record the biometric characteristics and store them as biometric data. By means of a master transponder 38, which is introduced briefly to the field of reader 28, associated control stations 10, 12, 14 are shifted into a recording state. Next, transponder 36 is introduced with the authorization code into the field of the same reader 28 and the biometric characteristics are also recorded by way of the sensor of recording device 30, 32, 34 assigned to control station 10, 12, 14.

With respect thereto, the biometric characteristics are entered in the memory of control station 10, 12, 14 as biometric data and linked thereto. The authorization code of transponder 36 is entered as a data set. This process is then repeated at all control stations 10, 12, 14 where access is to be granted.

If access to a plurality of control stations is possible, the biometric characteristics and the authorization code of transponder 36 can be recorded on a recording computer 40 and the data set comprising biometric data and the authorization code can be transmitted over a network to selected control stations 10, 12, 14. This may be a special network 42, in the event that existing network 26 between control stations 10, 12, 14 and code-evaluation devices 16 and/or central computer 18 is to remain unchanged, or it may be existing network 26. If existing network 26 is used, the data sets can also be transmitted to central computer 18 which then arranges for the data sets to be forwarded to selected control stations 10, 12, 14 over existing network 26.

With access control the person desiring access holds carried transponder 36 in the field of reader 28 and also enables the biometric data to be recorded, in that it operates the corresponding sensor of recording device 30, 32, 34. According to design, this can occur by way of hand or finger impressions, looking at the sensor or voice emission. With a positive comparison of the biometric characteristics to the stored biometric data and additionally matching authorization code, the authorization code is transmitted to the code-evaluation device 16 and/or central computer 18 which tests the authorization code and activates door opener 24 when access is permitted.

During testing of a match for the recorded biometric characteristics with the stored biometric data, the authorization code transmitted by transponder 36 to reader 28 is used for selecting the biometric data withdrawn for comparison from the overall databank. The stored biometric data are linked with associated authorization codes by transponder 36, and only those biometric data are withdrawn for comparison which are linked to the same authorization code, such as contained by transponder 36.

Only when adequate matching is established is the authorization code transmitted over network 26 to code-evaluation device 16 or to central computer 18. Despite their different biometric recording apparatus 30, 32, 34 individual control stations 12, 14, 16 behave outwardly identically, namely with respect to code-evaluation device 16, and to a control station having a reader exclusively for transponders, therefore without any biometric recording apparatus.

Figure 2:
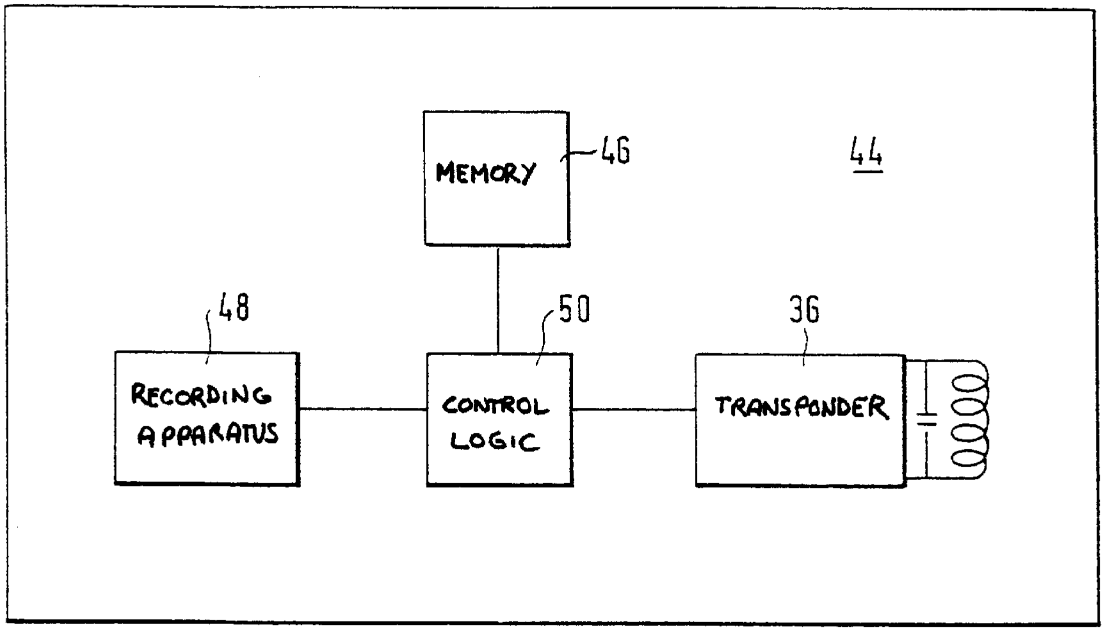
FIG. 2 is an embodiment of a mobile unit.

FIG. 2 illustrates an embodiment for a mobile unit which comprises, on a check card similar to an authorization card 44 and apart from a transponder 36, a memory 46 for biometric data, recording apparatus 48 having a sensor for biometric characteristics, for example a print sensor matrix for fingerprints, as well as control logic 50. Control logic 50 serves as a comparator for the biometric characteristics recorded by the sensor during processing of authorization card 44 with stored biometric data. With matching of the biometric characteristics with the stored biometric data, transponder 36 is activated and a similarly stored authorization code is transmitted to the reader. The energy supply of the electronic components on authorization card 44 occurs in a non-contact manner by way of the reader, whenever authorization card 44 is introduced to the field of the reader.

While several embodiments of the present invention have been shown and described, it is to be understood that many changes and modifications may be made thereunto without departing from the spirit and scope of the invention as defined in the appended claims.

What is claimed is:

1. An access control system connected over a network to a code-evaluation device to provide access based on a comparison of a person's biometric characteristics with biometric data stored in a memory, the system comprising:

(a) at least one mobile transponder to be carried by the person, said transponder having an authorization code; and (b) at least one local control station comprising:

(i) a reader by which said authorization code of said transponder can be read as the transponder is moved close to the reader in a non-contact manner and can be transmitted over the network to the code-evaluation device;

(ii) a recording device operated by said transponder for recording inalienable biometric characteristics of the person carrying the transponder; and (iii) a comparator coupled to said transponder for comparing locally within said control station the recorded biometric characteristics to the stored biometric data;

wherein a local comparison of the recorded biometric characteristics to stored biometric data is carried out to obtain a comparison result and depending on the comparison result:

(1) a data word containing the authorization code is transmitted over the network to the code-evaluation device only when a match exists between the recorded biometric characteristic and the stored biometric data; or (2) the data word containing the authorization code is transmitted over the network to the code-evaluation device constantly, and the comparison result is contained in the data word.

2. The access control system according to claim 1, wherein the stored biometric data are linked to an associated authorization code of the transponder and upon comparison of the recorded biometric characteristics to the stored biometric data only the biometric data valid for the respective authorization code of the transponder are selected.

3. The access control system according to claim 1, further comprising both control stations for low degrees of security, which exclusively comprise individual readers for transponders, and control stations for a high degree of security, which comprise both readers for transponders and biometric recording apparatus.

4. An access control system connected over a network to a code-evaluation device to provide access based on a comparison of a person's biometric characteristics with biometric data stored in a memory, the system comprising:

(a) at least one mobile transponder to be carried by the person, said transponder having an authorization code; and (b) at least one local control station comprising:

(i) a reader by which said authorization code of said transponder can be read as the transponder is moved close to the reader in a non-contact manner and can be transmitted over the network to the code-evaluation device;

(ii) a recording device operated by said transponder for recording inalienable biometric characteristics of the person carrying the transponder; and (iii) a comparator coupled to said transponder for comparing locally within a mobile unit comprising the transponder the recorded biometric characteristics to the stored biometric data;

wherein at least one sensor is arranged for recording of biometric characteristics within said mobile unit, and wherein a local comparison of the recorded biometric characteristics to stored biometric data is carried out to obtain a comparison result and depending on the comparison result:

(1) a data word containing the authorization code is transmitted over the network to the code-evaluation device only when a match exists between the recorded biometric characteristic and the stored biometric data; or (2) the data word containing the authorization code is transmitted over the network to the code-evaluation device constantly, and the comparison result is contained in the data word.

5. The access control system according to claim 4, further comprising both control stations for low degrees of security, which exclusively comprise individual readers for transponders, and control stations for a high degree of security, which comprise both readers for transponders and biometric recording apparatus.

6. The access control system according to claim 4, wherein the sensor arranged within the mobile unit is designed for recording fingerprints or hand prints.

7. The access control system according to claim 4, wherein the stored biometric data are linked to an associated authorization code of the transponder and upon comparison of the recorded biometric characteristics to the stored biometric data only the biometric data valid for the respective authorization code of the transponder are selected.

* * * * *